United States Patent
Nola

(10) Patent No.: US 10,495,024 B2
(45) Date of Patent: Dec. 3, 2019

(54) REINFORCED VEHICLE COMPONENT COVER

(71) Applicant: Ford Global Technologies, LLC, Dearborn, MI (US)

(72) Inventor: Gary Nola, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 15/725,976

(22) Filed: Oct. 5, 2017

(65) Prior Publication Data

US 2019/0107078 A1 Apr. 11, 2019

(51) Int. Cl.
| | |
|---|---|
| *F02F 7/00* | (2006.01) |
| *F02B 77/13* | (2006.01) |
| *B60R 13/08* | (2006.01) |
| *B60R 21/34* | (2011.01) |
| *F02M 35/04* | (2006.01) |
| *F02M 35/16* | (2006.01) |

(52) U.S. Cl.
CPC ........ *F02F 7/0068* (2013.01); *B60R 13/0838* (2013.01); *B60R 21/34* (2013.01); *F02B 77/13* (2013.01); *F02F 7/0073* (2013.01); *F02F 2007/0075* (2013.01); *F02M 35/04* (2013.01); *F02M 35/161* (2013.01)

(58) Field of Classification Search
CPC .................. F02F 7/0068; F02F 7/0073; F02F 2007/0075; F02B 77/13; F02M 35/04; F02M 35/161; F02M 35/104; B60R 13/0838; B60R 21/34
See application file for complete search history.

(56) References Cited

U.S. PATENT DOCUMENTS

| | | |
|---|---|---|
| 3,863,936 A | 2/1975 | Farnam et al. |
| 5,672,038 A | 9/1997 | Eaton |
| 6,463,635 B2 | 10/2002 | Murasaki |
| 6,883,627 B1 | 4/2005 | Staines et al. |
| 7,998,232 B2 | 8/2011 | Krueger et al. |
| 8,052,198 B2 | 11/2011 | Seksaria et al. |
| 8,221,042 B2 | 7/2012 | Vitali |
| 2005/0139541 A1* | 6/2005 | Peet .................. B01D 35/0273 210/436 |
| 2006/0073310 A1 | 4/2006 | Winkler |

(Continued)

FOREIGN PATENT DOCUMENTS

| | | |
|---|---|---|
| CN | 101400550 A | 4/2009 |
| EP | 1426237 A1 | 6/2004 |

(Continued)

OTHER PUBLICATIONS

Nola, G., "Reinforced Vehicle Component Cover," U.S. Appl. No. 15/725,925, filed Oct. 5, 2017, 50 pages.

*Primary Examiner* — Syed O Hasan
(74) *Attorney, Agent, or Firm* — Geoffrey Brumbaugh; McCoy Russell LLP

(57) ABSTRACT

Methods and systems are provided for a vehicle component cover. In one example, a vehicle component cover may be adapted to conceal vehicle components within an engine compartment, and the cover may include an embedded support structure having a plurality of notched sections. The support structure may deform at the plurality of notched sections to increase an energy absorption characteristic of the vehicle component cover.

17 Claims, 8 Drawing Sheets

(56) References Cited

U.S. PATENT DOCUMENTS

| | | |
|---|---|---|
| 2014/0238331 A1 | 8/2014 | Saito et al. |
| 2015/0075482 A1 | 3/2015 | Kondo et al. |
| 2016/0102630 A1* | 4/2016 | Kondo ................ B60R 13/0838 123/198 E |

FOREIGN PATENT DOCUMENTS

| | | |
|---|---|---|
| GB | 2506702 A | 4/2014 |
| WO | 2008055806 A1 | 5/2008 |

* cited by examiner

REINFORCED VEHICLE COMPONENT COVER

FIELD

The present description relates generally to methods and systems for a cover for a component of a vehicle.

BACKGROUND/SUMMARY

A motorized vehicle often includes one or more vehicle component covers shaped to couple with components of the vehicle in order to increase an aesthetic quality of the components and/or reduce an amount of noise generated by the vehicle. An engine compartment of a vehicle, for example, may include a cover positioned to obscure one or more sections of the engine and/or to display a make and/or model of the engine to a viewer.

One example approach towards an engine cover is shown by Krueger et al. in U.S. Pat. No. 7,998,232. Therein, a housing coupleable to a motor vehicle includes first and second rigid housing portions moveable relative to each other. The first housing portion includes an elongate support element connected at a first end to the first housing portion, the support element including a distally disposed end coupleable to a through opening of an elastic fixing element of the second housing portion.

However, the inventors herein have recognized potential issues with such systems. As one example, the engine compartment is often positioned at an end of the vehicle along a drive axis of the vehicle. A gap having a predetermined minimum size is often positioned between a hood covering the engine compartment of the vehicle and the engine in order to increase an energy-absorption characteristic of the hood. An engine cover formed of a rigid material or having a rigid shell that is positioned within the gap or extends into the gap may degrade the energy-absorption characteristic of the hood. Although engine covers formed of soft, deformable materials may be positioned partially or entirely within the gap without appreciably reducing the energy-absorption characteristic of the hood, soft covers often have a reduced durability and increased wear characteristics relative to more rigid covers.

In one example, the issues described above may be addressed by a vehicle component cover, comprising: a solid encasement; and a support structure embedded within the encasement, the support structure including a main section and a plurality of notched sections positioned along the main section. In this way, the support structure increases a rigidity and energy absorption characteristic of the vehicle component cover.

As one example, the support structure may deform (e.g., bend) and/or separate into a plurality of sections at the notched sections in response to an impact against the vehicle component cover. By configuring the support structure to deform and/or separate at the notched sections, the vehicle component cover may absorb an increased amount of mechanical energy from the impact. Additionally, during conditions in which the support structure is not deformed and/or separated at the notched sections, the support structure may increase a durability and rigidity of the vehicle component cover.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-8 are shown to scale, though other relative dimensions may be used, if desired.

DETAILED DESCRIPTION

Figure 3:
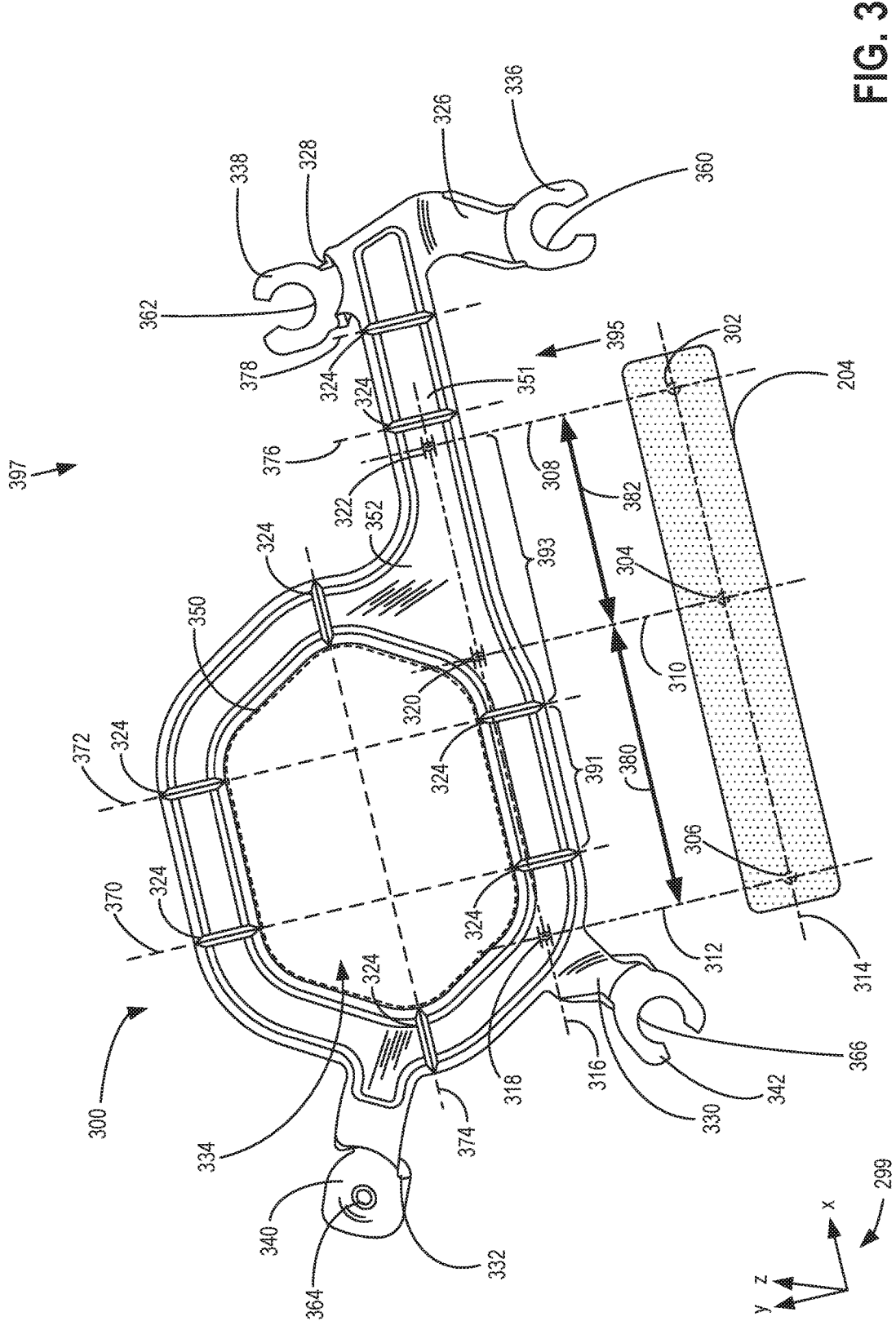
FIG. 3 shows a top perspective view of a support structure having a plurality of notched sections, the support structure configured to be embedded within the encasement of FIG. 2.
Figure 4:
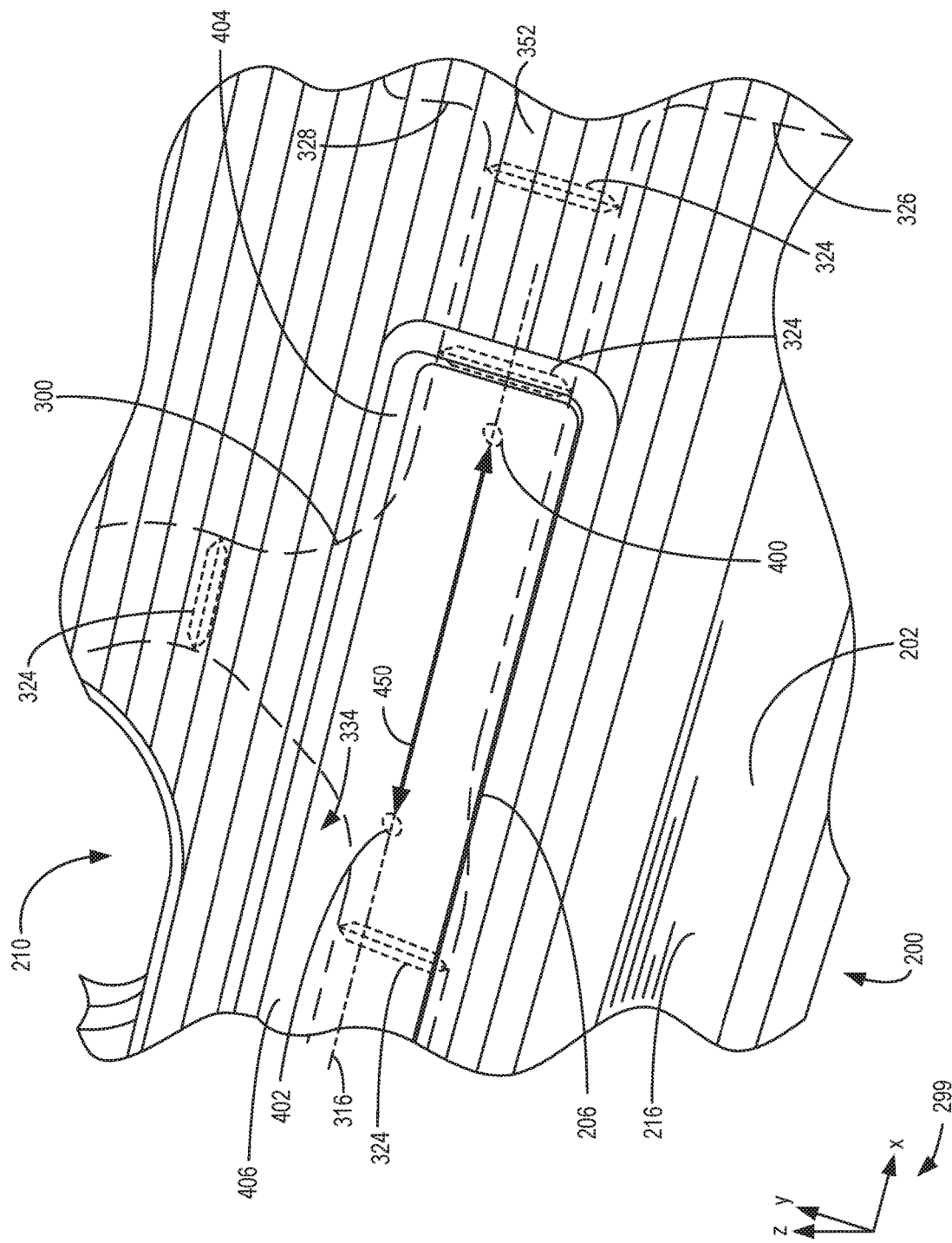
FIG. 4 shows a perspective view of a top surface of the vehicle component cover of FIG. 2, with a position of the support structure of FIG. 3 within the cover indicated by dashed lines.
Figure 5B:
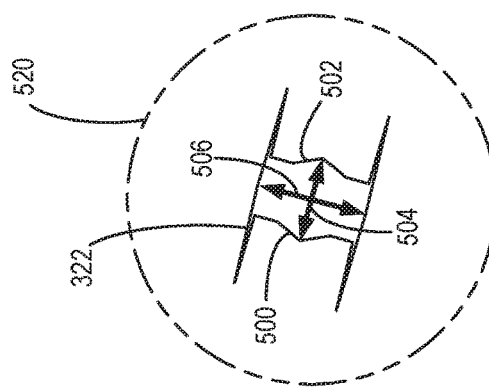
FIGS. 5A-5B show an enlarged perspective view of the support structure of FIGS. 3-4.
Figure 5A:
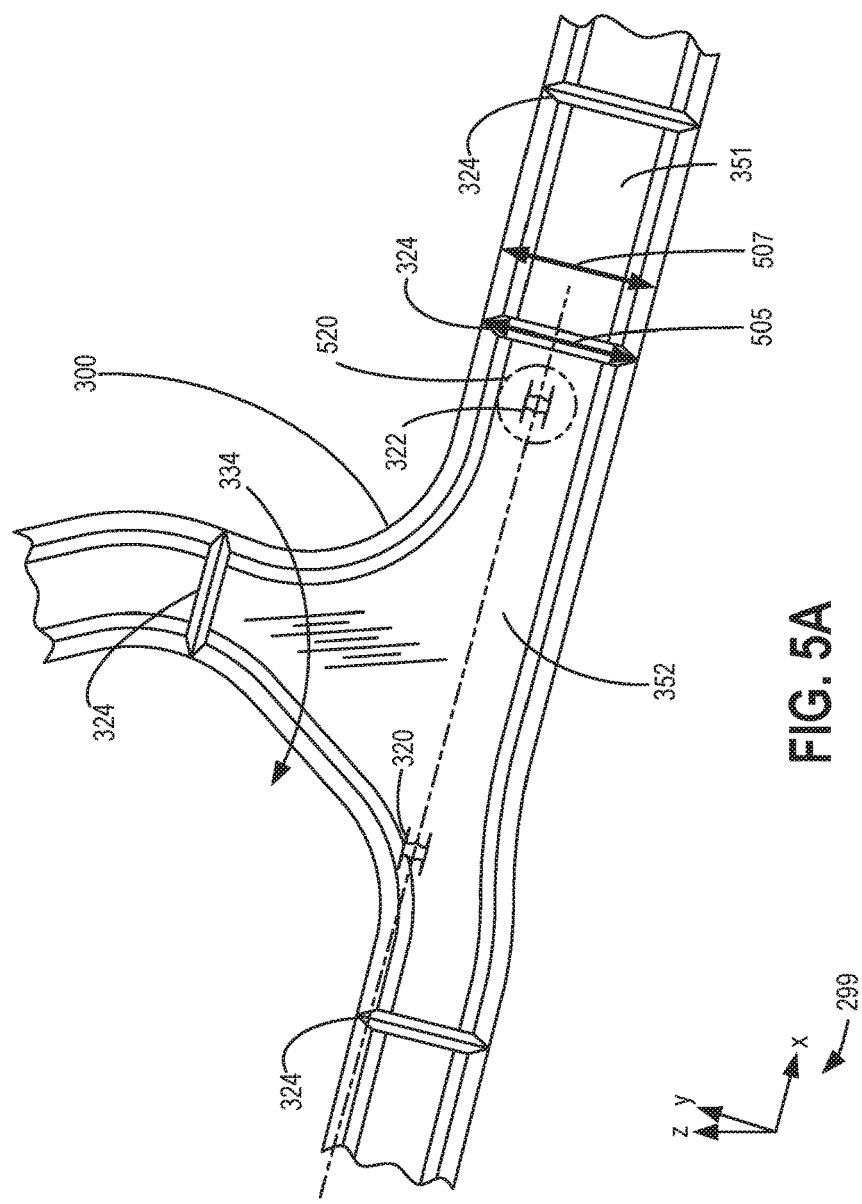
Figure 6:
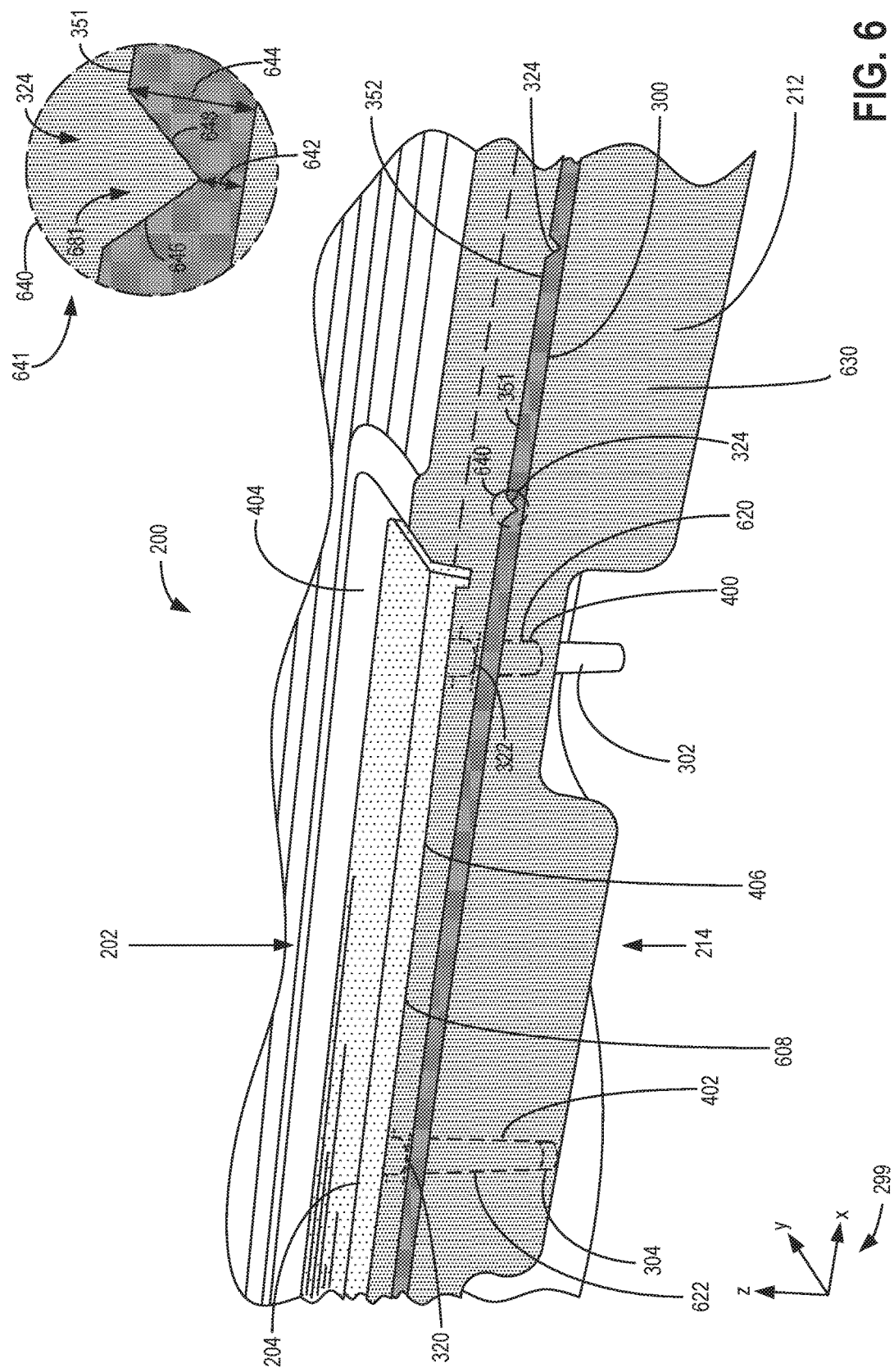
FIG. 6 shows a cross-sectional view of the support structure of FIGS. 3-4 embedded within the vehicle component cover of FIGS. 2 and 4.
Figure 7:
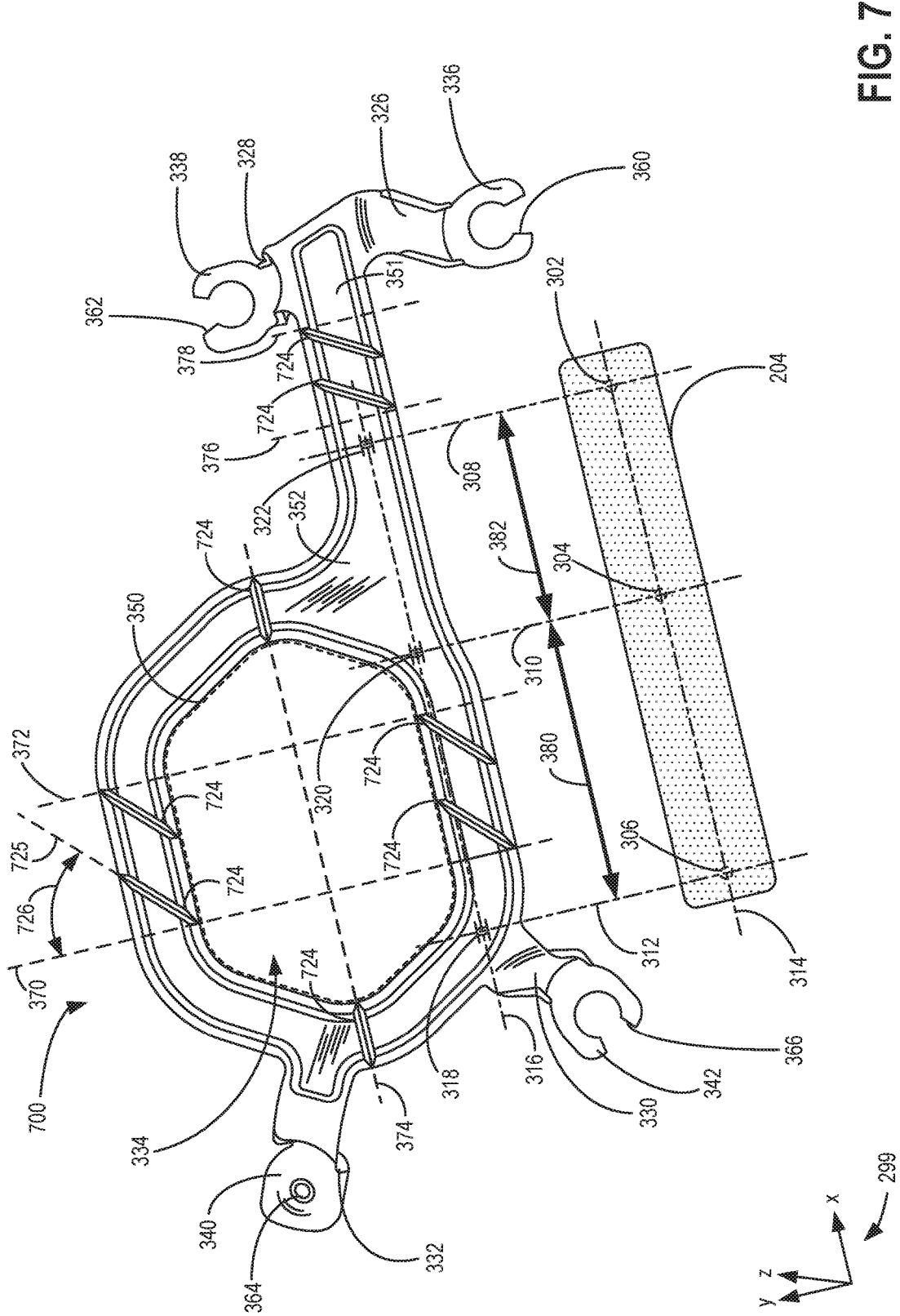
FIG. 7 shows a first alternate arrangement of notched sections of a support structure similar to the support structure of FIGS. 3-6.
Figure 8:
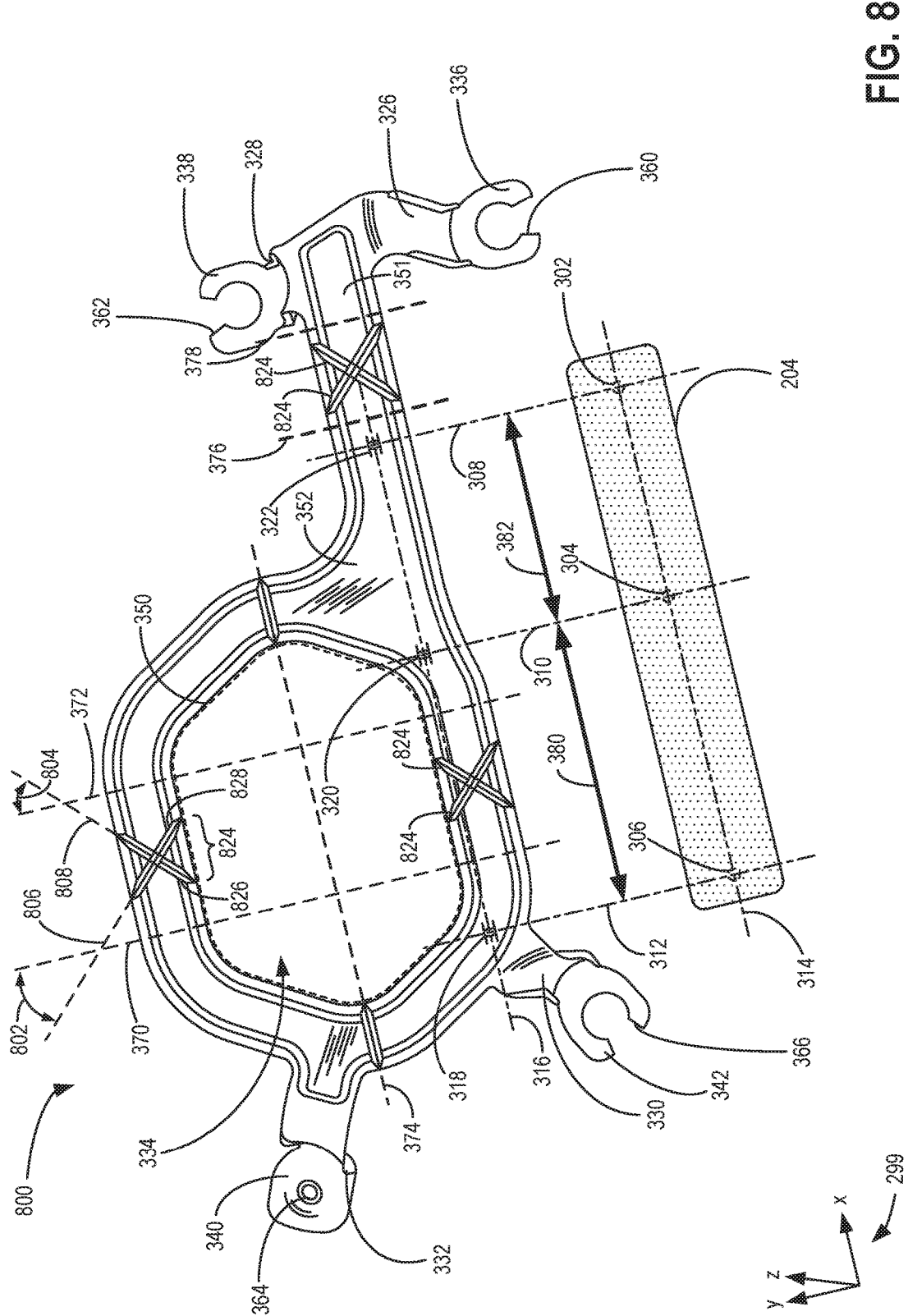
FIG. 8 shows a second alternate arrangement of notched sections of a support structure similar to the support structure of FIGS. 3-6.

The following description relates to systems and methods for a vehicle component cover. A vehicle, such as the vehicle shown by FIG. 1, may include an engine having a plurality of combustion chambers capped by a cylinder head. The cylinder head and other vehicle components positioned at a top end of the engine may be concealed by an engine cover, such as the engine cover shown by FIG. 2. The engine cover includes a support structure (as shown by FIG. 3) embedded within a solid encasement, as shown by FIG. 6. In some examples, the support structure may include a plurality of lock orifices positioned to align with a corresponding plurality of openings of the encasement, as shown by FIG. 4. The plurality of lock orifices are adapted to couple in locking engagement with a plurality of extensions of an emblem of the cover. In some examples, the support structure may include a plurality of notched sections adapted to increase an energy absorption quality of the support structure, as shown by FIGS. 5A-5B. In some examples, one or more of the notched sections may be angled differently relative to each other notched section, as shown by FIGS. 7-8. By configuring the engine cover to include the support structure embedded within the encasement, a durability of the engine cover may be increased and an amount of noise, vibration, and/or harshness of the engine may be decreased. Additionally, by configuring the support structure to include the plurality of notched sections, an energy absorption characteristic of the engine cover may be increased.

Figure 1:
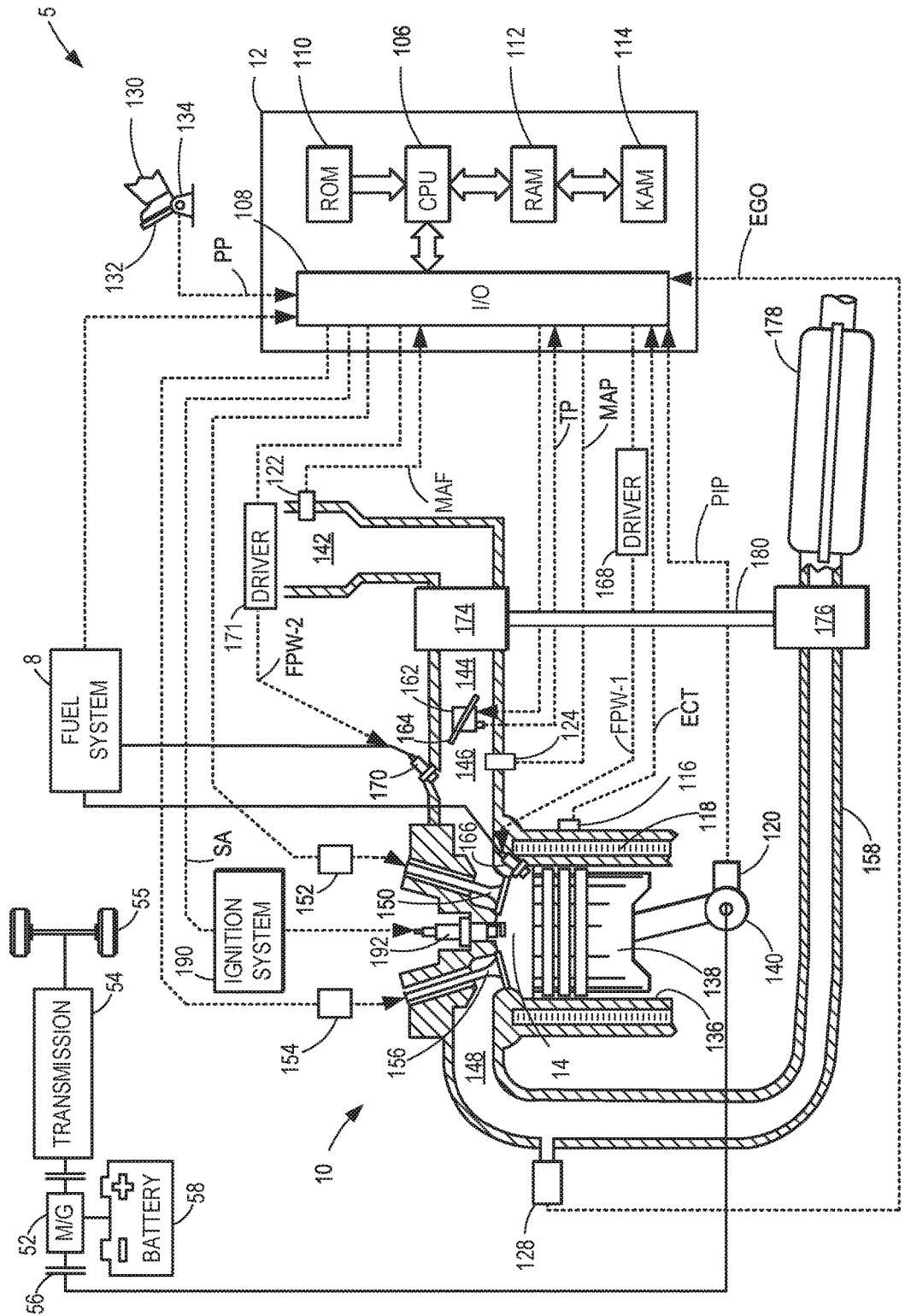
FIG. 1 schematically shows a combustion chamber of an engine included within a vehicle.

FIG. 1 depicts an example of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, intake air passage 146 may be one of a plurality of intake air passages fluidly coupled to the intake passage 144. The plurality of intake air passages may be referred to herein collectively as an intake manifold. Each passage of the intake manifold may be coupled to a different cylinder of the engine, for example, and intake air may flow to each cylinder from the intake air passage 144 and through the intake manifold. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIGS. 2-3, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as Eli) (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. The controller 12 receives signals from the various sensors of FIG. 1 and employs the various actuators of FIG. 1 to adjust engine operation based on the received signals and instructions stored on a memory of the controller. For example, controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature. In one example, the controller 12 may adjust an opening amount and/or timing of intake valve 150 by adjusting an actuator of the intake valve 150 (e.g., actuator 152, a described above) to adjust the opening amount and/or timing.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

The vehicle 5 includes a vehicle component cover (similar to the examples described below with reference to FIGS. 2-8) that may be positioned to obscure one or more vehicle components within a compartment of the vehicle (e.g., an engine compartment housing the engine 10). For example, the vehicle component cover (which may be referred to herein as an engine cover) may be positioned to partially or entirely obscure (e.g., visually block) engine 10. The vehicle component cover may additionally be configured to reduce a noise and/or vibration of the engine 10 via a solid encasement of the vehicle component cover, as described below.

FIGS. 2-8 show various views of a vehicle component cover 200 (and/or one or more components of the vehicle component cover 200). In one example, the vehicle component cover 200 may be the vehicle component cover described above with reference to FIG. 1. Reference axes 299 are included by each of FIGS. 2-8 for comparison of the views shown.

Figure 2:
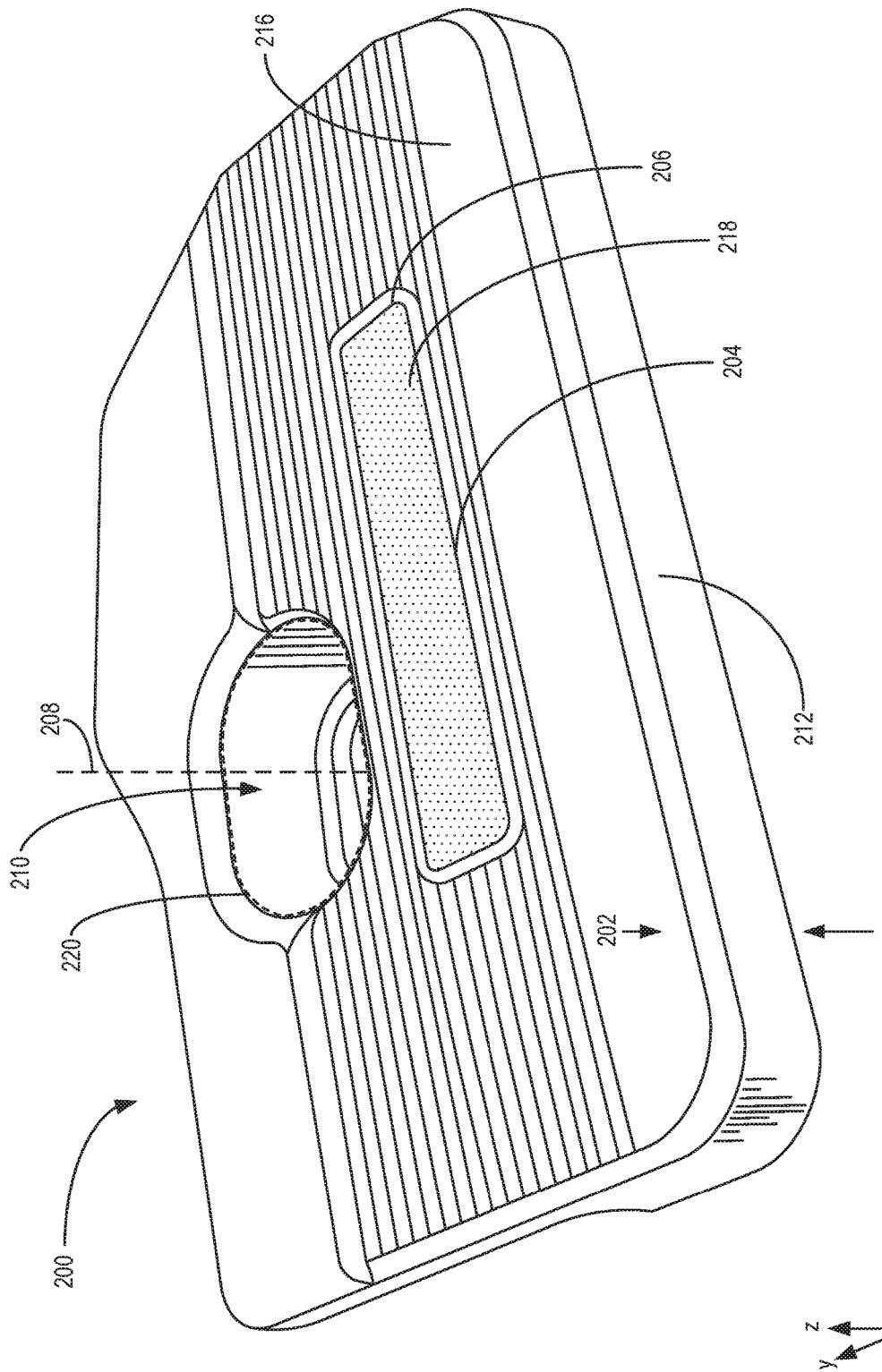
FIG. 2 shows a perspective view of a vehicle component cover for an engine, the vehicle component cover including a solid encasement.

FIG. 2 shows a perspective view of a vehicle component cover 200 (which may be referred to herein as an engine cover). The engine cover 200 is configured to couple to an engine of a vehicle (e.g., engine 10 of vehicle 5 described above with reference to FIG. 1) in order to visually block (e.g., obscure) one or more sections of the engine from view. For example, during conditions in which the engine cover 200 is coupled to the engine and a hood of the vehicle is in an opened position (e.g., a position in which the hood is pivoted away from the engine and an engine compartment of the vehicle is visually exposed from an exterior of the vehicle), the engine cover 200 may block an intake manifold of the engine from view (e.g., the intake manifold described above with reference to FIG. 1). Specifically, the engine cover 200 includes a top end 202 and a bottom end 214, and during conditions in which the engine cover 200 is coupled to the engine (e.g., the bottom end 214 of the engine cover 200 is positioned in face-sharing contact with one or more components positioned at an upper end of the engine, such as the intake manifold) and the engine compartment is opened (e.g., the hood is pivoted to an opened position), the top end 202 of the engine cover 200 is visually unblocked.

The engine cover 200 includes a solid encasement 212. The encasement 212 forms exterior surfaces of the engine cover 200, such as top surface 216 positioned at the top end 202 and away from the bottom end 214. The encasement 212 is formed of a compressible material. In one example, the compressible material (e.g., foam, rubber, etc.) may be an elastic material capable of temporarily compressing (e.g., deforming) in response to a force applied to the encasement 212. During conditions in which the force is not applied to the encasement 212, the elastic material may return to its initial, uncompressed shape. The compressible material may additionally include increased sound damping characteristics relative to other types of materials (e.g., metal, rigid plastic, etc.) and may reduce an amount of noise and/or vibration produced by the engine. In some examples, the encasement 212 may be formed of polyurethane foam (e.g., polyurethane foam with a density of eight pounds per cubic foot, or polyurethane foam having a different density).

The encasement 212 is a solid (e.g., not hollow) component of the cover 200 formed as a single piece. For example, encasement 212 may be formed via injection-molding. The encasement 212 does not include cavities, voids, etc. positioned within an interior 630 of the encasement 212 (as shown by FIG. 6). Specifically, the encasement 212 is not formed as a shell (e.g. a housing having an interior cavity) and is not separable into two or more pieces. However, encasement 212 is molded around a support structure 300 (shown by FIGS. 3-6 and described below), and the encasement 212 and support structure 300 together form a single unit. Specifically, support structure 300 is embedded within the encasement 212 and is surrounded by the encasement 212. Because the support structure 300 and encasement 212 are formed together as a single unit, the support structure 300 and encasement 212 are not separable from each other. The support structure 300 is described in further detail below with reference to FIGS. 3-6.

As shown by FIG. 2, the encasement 212 includes an open-ended recess 206 positioned at the top end 202 and formed by the top surface 216 of the encasement 212. The recess 206 is a depression in the top surface 216 that extends from the top surface 216 in a direction of the z-axis toward the bottom end 214. As shown by FIG. 4, the recess 206 includes a lower surface 406 joined to the top surface 216 via a plurality of sidewalls 404. The recess 206 is open at the top surface 216 and closed at the lower surface 406. The lower surface 406 is offset from the top surface 216 in a direction toward the bottom end 214, and the plurality of sidewalls 404 extend in a direction from the top end 202 toward the bottom end 214. In this way, the recess 206 only extends partially through the encasement 212. In one example, the sidewalls 404 may be positioned perpendicular to the lower surface 406. In other examples, the sidewalls 404 may be positioned at an angle relative to the lower surface 406. For example, a perimeter of the recess 206 at the top surface 216 may be larger than a perimeter of the recess at the lower surface 406, and the sidewalls 404 may taper from the top surface 216 to the lower surface 406.

The recess 206 is shaped to seat (e.g., house) an emblem 204 (which may be referred to herein as a badge), as shown by FIG. 2. In some examples, the emblem 204 may include ornamentation indicating a make, model, brand, type, etc. of a vehicle and/or engine. For example, emblem 204 may include ornamentation displaying a make of an engine configured to couple with the engine cover 200. In another example, emblem 204 may include ornamentation displaying a model of a vehicle having an engine compartment configured to house the engine cover 200. In yet another example, emblem 204 may include ornamentation displaying a model (e.g., a name) and/or manufacturer of the engine cover 200.

The ornamentation described above is positioned at an outer surface 218 of the emblem 204, and the outer surface 218 and ornamentation are visually unblocked during conditions in which the emblem 204 is coupled to the encasement 212 (e.g., seated within the recess 206). For example, as shown by the cross-sectional view of FIG. 6, the emblem 204 includes a bottom surface 608 positioned in face-sharing contact with the lower surface 406 of the recess 206 during conditions in which the emblem 204 is coupled to the encasement 212, and the outer surface 218 of the emblem 204 is positioned at the top end 202 of the engine cover 200. In other examples, the encasement 212 may not include the recess 206 and the emblem 204 may instead couple directly to the top surface 216.

In one example, emblem 204 may be formed of a material different than the material of the encasement 212. For example, emblem 204 may be formed of a rigid material such as plastic, metal, etc. In other examples, the emblem 204 may be formed of one or more different materials. Emblem 204 is separably coupled to the encasement 212 (e.g., via a plurality of extensions of the emblem 204, as described below with reference to FIG. 6). The emblem 204 may be decoupled (e.g., removed) from the encasement 212 for replacement, adjustment, etc.

In the example shown by FIG. 2, the encasement 212 includes a main aperture 210 (e.g., hole) having a perimeter 220 shaped to surround one or more components of the engine (e.g., engine 10 described above with reference to FIG. 1) during conditions in which the engine cover 200 is coupled to the engine. In one example, the perimeter 220 of the main aperture 210 may surround an oil inlet of the engine (e.g., an oil port sealed by a removable cap). An axis 208 positioned at a center of the main aperture 210 (e.g., centered within the perimeter 220 of the main aperture 210) extends in a direction from the top end 202 to the bottom end 214. Similarly, main aperture 210 extends entirely through the engine cover 200 from the top end 202 to the bottom end 214.

As described above, the support structure 300 (shown as a separate piece relative to the encasement 212 by FIG. 3) is embedded within the encasement 212. The support structure 300 is formed of a rigid material (e.g., plastic, metal, etc.) and increases a durability of the encasement 212 (e.g., reinforces the encasement 212). For example, as described above, the encasement 212 is formed of a compressible material. The support structure 300 is formed of a stiffer material (e.g., a substantially less compressible material than the material of the encasement 212) in order to increase a rigidity of the engine cover 200. Thus, the support structure 300 may have increased stiffness relative to the encasement 212. Additionally, the support structure 300 may include a plurality of arms configured to enable the support structure 300 to be coupled to the engine (e.g., via fasteners, such as bolts). By embedding the support structure 300 within the encasement 212, the encasement 212 may be formed of a more compressible material having increased noise reduction and energy absorption characteristics, and the support structure 300 may be formed of stiffer, less compressible material (e.g., non-compressible material) to increase the rigidity and durability of the engine cover 200 (e.g., by reinforcing the surrounding encasement 212).

The support structure 300 includes a front end 395 and an opposing back end 397. During conditions in which the cover 200 is coupled to the engine, the front end 395 is positioned at a front end of the engine and the back end 397 is positioned toward a back end of the engine (e.g., away from the front end). The support structure 300 may include an annular opening 334 having a perimeter 350 shaped to surround (e.g., encircle) the perimeter 220 of the main aperture 210 of the encasement 212. The support structure 300 may be embedded within the encasement 212 in a position in which no portion of the support structure 300 extends into the main aperture 210. In other examples, the encasement 212 may not include the main aperture 210 and/or the support structure 300 may not include the annular opening 334.

The support structure 300 includes a main section 352 having a substantially flat, planar profile (as shown by the cross-sectional view of FIG. 6). For example, as shown by FIGS. 3-6, the main section 352 of the support structure 300 extends substantially in the directions of the x-axis and y-axis of reference axes 299. Support structure 300 includes a plurality of arms (e.g., first arm 326, second arm 328, third arm 330, and fourth arm 332) joined to the main section 352 and extending in directions away from the main section 352. For example, as shown by FIG. 3, each of the arms extends in a perpendicular direction relative to the main section 352 (e.g., in a direction of the z-axis of reference axes 299, and in a radial direction relative to axis 316) and away from the top end 202 of the encasement 212. Each arm may include a tab positioned away from the main section 352. For example, first arm 326 includes a first tab 336, second arm 328 includes a second tab 338, third arm 330 includes a third tab 342, and fourth arm 332 includes a fourth tab 340). Each of the tabs may be substantially flat (e.g., planar) and, in some examples, each of the tabs may extend in a perpendicular direction relative to the arms (e.g., in a direction of the x-axis and y-axis of the reference axes 299 and parallel to the main section 352). The plurality of arms may further provide reinforcement for the encasement 212 and increase a durability and rigidity of the encasement 212.

In some examples, one or more of the tabs (e.g., first tab 336, second tab 338, third tab 342, and/or fourth tab 340) may include an aperture or slot shaped to receive a fastener (e.g., a bolt). For example, as shown by FIG. 3, first tab 336 includes first slot 360, second tab 338 includes second slot 362, third tab 342 includes third slot 366, and fourth tab 340 includes aperture 364. In some examples, one or more arms of the plurality of arms may extend outward from the encasement 212 to an exterior of the encasement 212. For example, a first portion of an arm of the plurality of arms may be partially embedded within the encasement 212, and a second portion of the arm may extend outward from the encasement 212 to a location external to the encasement 212 (e.g., to a mounting bracket included by the engine). During conditions in which the tabs are coupled to the engine via fasteners, the fasteners may press against surfaces of the tabs in order to retain a position of the engine cover 200 relative to the engine. For example, a fastener inserted into the first slot 360 of the first tab 336 may press the surfaces of the first tab 336 into engagement (e.g., into face-sharing contact) with one or more surfaces of the engine, a component of the engine (e.g., intake manifold), and/or other vehicle component (e.g., a frame of the vehicle). Because the support structure 300 is embedded within the encasement 212, and because the encasement 212 and support structure 300 are formed together as a single unit, coupling the arms of the support structure 300 to the vehicle in this way secures (e.g., maintains) the position of the engine cover 200 within the engine compartment (e.g., maintains the position of the engine cover 200 relative to the engine). In some examples, first slot 360, second slot 362, and third slot 366 may each include a corresponding ball stud grommet (not shown), and each ball stud grommet may be coupled to a corresponding ball stud of the engine. For example, first slot 360 may include a first ball stud grommet adapted to couple to a first ball stud protruding from the engine at a first location, second slot 362 may include a second ball stud grommet adapted to couple to a second ball stud protruding from the engine at a second location, and third slot 366 may include a third ball stud grommet adapted to couple to a third ball stud protruding from the engine at a third location.

In some examples (e.g., as shown by FIGS. 3-6), the support structure 300 may include a plurality of notched sections 324 (which may be referred to herein as notched tabs) positioned along the main section 352. In the example described herein, the support structure 300 includes eight notched sections 324. In other examples, the support structure 300 may include a different number and/or arrangement of notched sections (e.g., four, five, ten, etc.). In some examples, the front end 395 of the support structure 300 (e.g., front end of main section 352) may include a greater number of notched sections 324 than the back end 397 of the support structure 300 (e.g., back end of main section 352), or vice versa. Each notched section 324 may extend across a width 507 of the main section 352 (as shown by FIG. 5B). For example, as shown by FIG. 3, two notched sections 324 are positioned along axis 370 and extend in a direction of the axis 370 along the main section 352, with axis 370 being arranged in a normal direction relative to the surfaces of the support structure 300 intersected by the axis 370. Similarly, two notched sections 324 are positioned along axis 372 and extend in a direction of the axis 372 along the main section 352, two notched sections 324 are positioned along axis 374 and extend in a direction of the axis 374 along the main section 352, one notched section 324 is positioned along axis 376 and extends in a direction of the axis 376 along the main section 352, and one notched section 324 is positioned along axis 378 and extends in a direction of the axis 378 along the main section 352. The axes 372, 374, 376, and 378 are each arranged in normal directions relative to the surfaces of the support structure 300 that they intersect (e.g., edges of the support structure 300 positioned at an outer perimeter of the main section 352). In some examples, one or more the notched sections 324 (e.g., notched sections surrounding annular opening 334) may extend in a radial direction relative to axis 208 positioned at the center of the main aperture 210 (shown by FIG. 2). For example, the support structure 300 may be embedded within the encasement 212 such that the annular opening 334 surrounds the main aperture 210, and the notched sections positioned at the portion of the main section 352 surrounding the main aperture 210 may be arranged radially relative to the axis 208.

A thickness 642 of each notched section 324 is less than a thickness 644 of the main section 352 in a direction of the z-axis of reference axes 299 (e.g., a normal direction relative to an outer surface 351 of the main section 352, and a direction of the axis 208). Each notched section 324 extends partway into the thickness 644 of the main section 352 (e.g., by an amount corresponding to a difference between the thickness 642 of each notched section 324 and the thickness 644 of the main section 352). As shown by the enlarged view 641 of inset 640 in FIG. 6, each notched section 324 includes a notch 681 formed by a first angled surface 646 and a second angled surface 648, with the first angled surface 646 and second angled surface 648 being angled relative to the outer surface 351 of the main section 352. The first angled surface 646 and the second angled surface 648 may be angled relative to the outer surface 351 of the main section 352 in opposing directions by a same amount of angle. For example, first angled surface 646 may be angled by 45 degrees in a first direction relative to the outer surface 351, and the second angled surface 648 may be angled by 45 degrees in a second direction relative to the outer surface 351, with the first direction being opposite to the second direction. As shown by FIG. 5A, each notched section is positioned at a different, corresponding location of a plurality of locations along the main section 352. In some examples, a length 505 of each notched section is the same as a width 507 of the main section 352 at each location, with the length 505 being in a same direction as the width 507.

In other examples (such as the examples shown by FIGS. 7-8), the support structure may include notched sections positioned in a different arrangement relative to the example shown by FIG. 3 and described above. For example, FIG. 7 shows a support structure 700 and FIG. 8 shows a support structure 800, with the support structure 700 and support structure 800 each being similar to the support structure 300 described above with reference to FIG. 3. The support structure 700 and support structure 800 include parts similar to those described above with reference to support structure 300 (e.g., main section 352, annular opening 334 first arm 326, second arm 328, third arm 330, fourth arm 332, etc.). Similar parts may be labeled similarly and not re-introduced. The support structure 700 and support structure 800 are each configured to be embedded within a solid encasement of a vehicle component cover (e.g. encasement 212 of engine cover 200 described above).

Support structure 700 shown by FIG. 7 includes notched sections 724. Notched sections 724 are similar to the notched sections 324 described above with reference to FIG. 3. However, the notched sections 724 are positioned at an angle relative to the notched sections 324 across the width of the main section 352. For example, FIG. 7 shows axis 725 positioned at an angle relative to axis 370 and axis 372. One or more of the notched sections 724 may extend across the main section 352 in a direction parallel to the axis 725 (e.g., at an angle 726 relative to the axis 370). Similarly, support structure 800 shown by FIG. 8 includes notched sections 824 (similar to the notched sections 724), with the notched sections 824 being positioned at an angle relative to the notched sections 324 across the width of the main section 352. In the example shown by FIG. 8, the notched sections 824 intersect with each other along the main section 352. For example, a first notched section 826 positioned along axis 806 and extending in a direction of the axis 806 intersects with a second notched section 828 positioned along axis 808 and extending in a direction of the axis 808. Axis 806 is positioned at an angle 802 relative to the axis 370, and axis 808 is positioned at an angle 804 relative to the axis 372, with the axis 370 and axis 372 being parallel to each other, and with the axis 806 and axis 808 being not parallel to each other. In one example, axis 806 and axis 808 may be positioned perpendicular to each other.

By configuring a support structure embedded within a solid encasement of a vehicle component cover (e.g., encasement 212 of engine cover 200) to include the notched sections as described above (e.g., support structure 300 including notched sections 324, support structure 700 including notched sections 724, or support structure 800 including notched sections 824), an energy absorption characteristic of the support structure may be increased. For example, in response to an impact (for example), the support structure 300 may deform (e.g., bend, fold, etc.) and/or separate into a plurality of sections at the notched sections 324 in order to absorb a greater amount of mechanical energy from the impact. In one example, the support structure 300 may deform along axes positioned parallel to one or more of the notched sections 324 (e.g., axis 370, axis 372, axis 374, etc.). In the example of the support structure 700 shown by FIG. 7 and described above, the support structure 700 may deform along axes positioned parallel to one or more of the notched sections 724 (e.g., axis 725).

In the example of the support structure 800 shown by FIG. 8 and described above, the support structure 800 may deform along axes positioned parallel to one or more of the notched sections 824 (e.g., axis 806 parallel to first notched section 826, and/or axis 808 parallel to second notched section 828). In other examples, the notched sections may have a different relative arrangement and the support structure may deform along different axes corresponding to the direction of extension of the notched sections. Each notched section 324 may separate the main section 352 into a plurality of breakaway sections, as shown by first breakaway section 391 and second breakaway section 393 of FIG. 3. In response to an impact, the first breakaway section 391 and second breakaway section 393 may separate from each other at the notched section 324, enabling the support structure 300 to absorb an increased amount of mechanical energy from the impact. The main section 352 is configured such that, for each breakaway section of the plurality of breakaway sections, a corresponding notched section of the plurality of notched sections joins the breakaway section to an adjacent, corresponding breakaway section of the plurality of breakaway sections. For example, the first breakaway section 391 is joined to the second breakaway section 393 by the notched section 324, with the second breakaway section 393 and first breakaway section 391 being positioned adjacent to each other.

In this way, the number and relative arrangement of the notched sections determines the energy absorption characteristics (e.g., deforming characteristics) of the support structure (e.g., the axes along which the support structure may deform). For example, because the support structure 300 includes notched sections 324 positioned along the axis 374, the support structure 300 may have an increased likelihood to deform along axis 374 in response to an impact relative to the support structure 800 (which does not include notched sections positioned along the axis 374). Similarly, because the support structure 800 includes notched sections 824 positioned along the axes 806 and 808, the support structure 800 may have an increased likelihood to deform along axis 806 and/or axis 808 in response to an impact relative to the support structure 300. In each example, during conditions in which the support structure (e.g., support structure 300, support structure 700, and support structure 800) is not deformed (e.g., the support structure has not absorbed mechanical energy from an impact), the support structure increases a rigidity and durability of the engine cover.

In some examples, the support structure 300 (and similarly, support structure 700 and/or support structure 800) may include a plurality of lock orifices positioned along the main section 352. For example, FIG. 3 shows a first lock orifice 318, a second lock orifice 320, and a third lock orifice 322 aligned with each other along axis 316 (e.g., positioned along axis 316, with axis 316 intersecting a midpoint of each lock orifice). In other examples, the support structure may include a different number of lock orifices (e.g., two, five, etc.) and/or a different arrangement of lock orifices (e.g., with one or more of the first lock orifice 318, second lock orifice 320, and/or third lock orifice 322 being positioned along a different axis than each other lock orifice).

The emblem 204 includes a plurality of extensions (e.g., first extension 306, second extension 304, and third extension 302) positioned to couple with (e.g., slide into locking engagement with) the plurality of lock orifices during conditions in which the emblem 204 is seated within the recess 206 of the encasement 212 (as shown by FIG. 2 and described above). In the example shown by FIG. 3, the plurality of extensions are aligned with each other along axis 314, similar to the alignment of the plurality of lock orifices along the axis 316. For example, a distance 380 from the first lock orifice 318 to the second lock orifice 320 in a direction of the axis 316 (e.g., the distance 380 from axis 312 to axis 310 in the direction of axis 316, with the axes 312 and 310 each being perpendicular to the axis 316, and with the axis 312 intersecting a midpoint of the first lock orifice 318 and the axis 310 intersecting the midpoint of the second lock orifice 320) is the same as the distance between the first extension 306 and the second extension 304 in a direction of the axis 314 (with the axis 314 being parallel to the axis 316 and positioned along the axis 316 during conditions in which the emblem 204 is coupled to the support structure 300 by coupling the plurality of extensions to the plurality of lock orifices). Similarly, a distance 382 from the second lock orifice 320 to the third lock orifice 322 in a direction of the axis 316 (e.g., the distance 380 from axis 310 to axis 308 in the direction of axis 316, with the axes 310 and 308 each being perpendicular to the axis 316, and with the axis 310 intersecting a midpoint of the second lock orifice 320 and the axis 308 intersecting the midpoint of the third lock orifice 322) is the same as the distance between the second extension 304 and the third extension 302 in a direction of the axis 314.

As shown by FIG. 4, the recess 206 of the encasement 212 includes a plurality of openings (e.g., first opening 400 and second opening 402) positioned to align with the plurality of lock orifices of the support structure 300. Specifically, a separate, corresponding opening of the plurality of openings is positioned to align with each lock orifice of the support structure 300. For example, the first opening 400 is positioned to align with the third lock orifice 322 in a direction from the bottom end 214 to the top end 202 (with the bottom end 214 and top end 202 being shown by FIG. 2), and the second opening 402 is positioned to align with the second lock orifice 320 in the direction from the bottom end 214 to the top end 202 (e.g., in a direction of the z-axis of reference axes 299).

In the example shown by FIG. 4, the plurality of openings are aligned with each other along axis 316 (which may be referred to herein as a lateral axis of the cover), similar to the alignment of the plurality of lock orifices along the axis 316. For example, a distance 450 from the first opening 400 to the second opening 402 in the direction of the axis 316 is the same as the distance 382 (shown by FIG. 3 and described above) from the second lock orifice 320 to the third lock orifice 322 in the direction of the axis 316. Similarly, a third opening (not shown) of the plurality of openings of the recess 206 positioned away from the second opening 402 and first opening 400 by a same distance from the second opening 402 in the direction of the axis 316 as the distance 380 from the first lock orifice 318 to the second lock orifice 320. In one example, each opening of the plurality of openings is positioned at an end of a separate passage open at both the top end 202 and the bottom end 214 of the encasement 212, with the passage extending entirely through the encasement 212 in the direction from the top end 202 to the bottom end 214. For example, the passage 622 shown by FIG. 6 forms the first opening 400, and the passage 620 shown by FIG. 6 forms the second opening 402. The support structure is embedded within the encasement in a position such that each passage (e.g., passage 622 and passage 620) is intersected by a corresponding lock orifice of the plurality of lock orifices. For example, passage 622 is intersected by second lock orifice 320, and passage 620 is intersected by third lock orifice 322. In other examples, each passage may be open at the top end 202 and closed at the bottom end 214 of the encasement 212 and may extend partially through the encasement 212 in the direction from the top end 202 to the bottom end 214. In yet other examples, one or more of the passages may be opened at both the top end 202 and the bottom end 214, and one or more of the openings may be opened at the top end 202 and closed at the bottom end 214. In some examples, each passage of the plurality of passages tapers from a larger, first diameter at the recess 206 to a smaller, second diameter in a direction from the top end 202 to the bottom end 214. Additionally, each extension of the plurality of extensions may taper from a third diameter to a smaller, fourth diameter, similar to the tapering of the passages described above.

Although the openings of the plurality of openings of the recess 206 are aligned with each other in the direction of the axis 316 in the example described herein, in other examples the openings may be positioned differently (e.g., not aligned with each other). However, in each example, each opening of the plurality of openings is aligned with a corresponding lock orifice of the plurality of lock orifices in the direction from the top end 202 to the bottom end 214 (e.g., in the direction of the z-axis of reference axes 299). For example, in examples in which the lock orifices positioned in a different arrangement relative to the example shown by FIG. 3 (e.g., examples in which the lock orifices are not positioned aligned along a same axis), the openings of the recess 206 are positioned in a similar arrangement so that each opening of the recess 206 (and each corresponding passage forming the openings) is aligned with a corresponding lock orifice of the support structure 300. In yet other examples which do not include the recess 206, the openings of the plurality of openings (e.g., first opening 400, second opening 402, etc.) may instead be positioned at the top surface 216 and each passage forming the openings (e.g., passage 620, passage 622, etc.) may extend from the top surface 216 toward the bottom end 214, with each opening being aligned with a corresponding lock orifice of the support structure 300 in the direction from the top surface 216 toward the bottom end 214 (e.g., the direction of the z-axis of reference axes 299).

Each of the lock orifices (e.g., first lock orifice 318, second lock orifice 320, and third lock orifice 322) may be a self-locking orifice shaped to engage with a corresponding extension of the plurality of extensions of the emblem 204 in order to couple the emblem 204 to the encasement 212 (e.g., lock the emblem 204 into the recess 206). As an example, FIG. 5B shows an enlarged view of an area 520 surrounding the third lock orifice 322, the area 520 being shown by FIG. 5A. Although the third lock orifice 322 is shown as an example, each other lock orifice (e.g., first lock orifice 318 and second lock orifice 320) may include a similar configuration.

The third lock orifice 322 includes a first notched tab 500 and a second notched tab 502 (which may each be referred to herein as notched sections), as shown by FIG. 5B. Each notched tab (e.g., first notched tab 500 and second notched tab 502) is adapted to hold a corresponding extension of the plurality of extensions in place. As an example of the intersection of each lock orifice with each corresponding passage of the encasement 212, the support structure may be embedded within the encasement 212 in a position in which the first notched tab 500 and second notched tab 502 are positioned partially or entirely within the passage 620. Each other lock orifice (e.g., first lock orifice 318 and second lock orifice 320) includes notched tabs similar to the first notched tab 500 and second notched tab 502, and the notched tabs of the lock orifices may be positioned partially or entirely within (e.g., partially or entirely intersecting) the corresponding passages of the encasement. For example, notched tabs of the second lock orifice 320 may be positioned partially or entirely within passage 622, and notched tabs of the first lock orifice 318 may be positioned partially or entirely within a passage (not shown) forming the third opening at the recess 206. During conditions in which a corresponding extension of the plurality of extensions of the emblem 204 (e.g., third extension 302) is inserted (e.g., slides) through the third lock orifice 322, the first notched tab 500 and second notched tab 502 are pressed away from the extension and may temporarily bend in a direction away from the emblem 204.

In some examples, the first notched tab 500 and second notched tab 502 may be formed of a same material as the support structure 300 (e.g., metal, plastic, etc.) and may have spring-like characteristics. For example, during conditions in which the third extension 302 is not inserted into the third lock orifice 322, a width 504 of the third lock orifice 322 between the first notched tab 500 and the second notched tab 502 is less than a diameter of the third extension 302, and a length 506 of the third lock orifice 322 is greater than the diameter of the third extension 302. However, during conditions in which the third extension 302 is inserted into the third lock orifice 322, the first notched tab 500 and second notched tab 502 are pivoted away from each other by the third extension 302, increasing the width 504 between the first notched tab 500 and the second notched tab 502. As the third extension 302 slides through the third lock orifice 322, the first notched tab 500 and second notched tab 502 may resist pivoting by the third extension 302 and may press against the third extension 302 to lock the third extension 302 into engagement with the third lock orifice 322. In this way, the notched tabs of the third lock orifice 322 enable the third extension 302 of the emblem 204 to slide through the third lock orifice 322 in a first direction (e.g., the direction from the top end 202 to the bottom end 214) but do not enable the third extension 302 to slide through the third lock orifice 322 in a second direction opposite to the first direction (e.g., from the bottom end 214 to the top end 202). Locking the third extension 302 to the third lock orifice 322 in this way restrains (e.g. locks) the third extension 302 from sliding in the opposite, second direction.

Coupling the emblem 204 to the engine cover 200 as described above includes sliding the plurality of extensions of the emblem 204 (e.g., first extension 306, second extension 304, and third extension 302) into locking engagement with the plurality of lock orifices of the support structure (e.g., support structure 300, support structure 700, or support structure 800) embedded within the solid encasement 212 of the cover 200. For example, first extension 306 slides into locking engagement with the first lock orifice 318, second extension 304 slides into locking engagement with the second lock orifice 320, and third extension 302 slides into locking engagement with the third lock orifice 322. The plurality of extensions are locked into engagement with the plurality of lock orifices only by sliding the plurality of extensions through the plurality of lock orifices. For example, the plurality of extensions may slide through the plurality of passages (e.g., passage 620, passage 622, etc.) forming the plurality of openings (e.g., first opening 400, second opening 402, etc.), with the plurality of openings being positioned at the recess 206. For each extension of the plurality of extensions, the extension presses against self-locking section of a corresponding lock orifice of the plurality of lock orifices. In one example, the self-locking section may be one or more notched tabs, similar to the first notched tab 500 and second notched tab 502 of third lock orifice 322 described above with reference to FIG. 5B. Pressing the extension against the self-locking section of the corresponding lock orifice may include pivoting the self-locking section in a direction away from the extension. For example, as the third extension 302 slides through the passage 620 and presses against the third lock orifice 322, the first notched tab 500 and second notched tab 502 may be pivoted in a direction away from the third extension 302 by the third extension 302. In addition to coupling the emblem 204 to the cover 200, the cover 200 may be coupled to the engine (e.g., engine 10) by inserting a fastener (e.g., bolt) through an opening of an arm of the support structure 300 (e.g., 360 of 336 of 326, 362 of 338 of 328, 364 of 340 of 332, and/or 366 of 342 of 330) and into a corresponding opening of the engine, vehicle component, or component of the engine.

FIG. 6 shows a cross-sectional view of the emblem 204 coupled to the encasement 212. Specifically, the emblem 204 is seated within the recess 206, the third extension 302 is inserted through the third lock orifice 322 via first opening 400, and the second extension 304 is inserted through the second lock orifice 320 via second opening 402. Although not shown by FIG. 6, the first extension 306 is inserted through the first lock orifice 318 via the third opening (not shown) of the plurality of openings of the recess 206, with the third opening being formed by a passage extending through the encasement 212 (e.g., similar to passage 620 and passage 622). In the configuration shown by FIG. 6, the third extension 302 is locked into engagement with the third lock orifice 322, the second extension 304 is locked into engagement with the second lock orifice 320, and the first extension 306 is locked into engagement with the first lock orifice 318 (e.g., via pivoting of notched tabs of each locked orifice, as described in the example above with reference to first notched tab 500 and second notched tab 502 of third lock orifice 322).

In this configuration, the emblem 204 may be coupled to the encasement 212 without additional fasteners (e.g., bolts, nuts, clips, etc.). For example, as shown by FIG. 6, no additional fasteners are coupled to the extensions of the emblem 204 at the bottom end 214 of the engine cover 200. The emblem 204 is locked into position within the recess 206 by the engagement of the lock orifices of the support structure 300 with the plurality of extensions of the emblem 204. By configuring the emblem 204 to lock to the support structure 300 without fasteners, an assembly time and/or cost of the engine cover 200 may be reduced (e.g., by reducing an amount of components to couple the emblem 204 to the support structure 300 and encasement 212).

FIGS. 2-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, the support structure embedded within the solid encasement of the vehicle component cover increases the rigidity of the vehicle component cover. The support structure may additionally increase the energy absorption characteristic and/or an ease of assembly of the vehicle component cover. By including the plurality of notched sections positioned across the main section of the support structure, the support structure may deform in order to absorb an increased amount of mechanical energy (e.g., from an impact to the vehicle component cover). By configuring the support structure to include the plurality of lock orifices, the lock orifices may engage (e.g., couple) with the extensions of the emblem in order to enable the emblem to be coupled to the engine cover without fasteners and to retain the position of the emblem relative to the encasement and support structure. The technical effect of sliding the extensions of the emblem through the lock orifices is to lock the emblem against the surfaces of the encasement. The technical effect of enabling the support structure to deform via the plurality of notched sections is to increase the energy absorption characteristic of the engine cover.

In one embodiment, a vehicle component cover comprises: a solid encasement; and a support structure embedded within the encasement, the support structure including a main section and a plurality of notched sections positioned along the main section, with each notched section of the plurality of notched sections extending partway into a thickness of the main section. In a first example of the cover, the support structure is comprised of a stiffer material than the solid encasement. A second example of the cover optionally includes the first example, and further includes wherein each notched section of the plurality of notched sections is positioned at a different, corresponding location of a plurality of locations along the main section, and wherein a length of each notched section is the same as a width of the main section at the corresponding location. A third example of the cover optionally includes one or both of the first and second examples, and further includes wherein the length of each notched section is arranged in a same direction as the width of the main section at the corresponding location. A fourth example of the cover optionally includes one or more or each of the first through third examples, and further includes wherein the length of each notched section is arranged at an angle relative to the width of the main section at the corresponding location. A fifth example of the cover optionally includes one or more or each of the first through fourth examples, and further includes wherein the support structure includes an annular section shaped to encircle a main opening of the solid encasement. A sixth example of the cover optionally includes one or more or each of the first through fifth examples, and further includes wherein the annular section includes one of the notched sections of the plurality of notched sections. A seventh example of the cover optionally includes one or more or each of the first through sixth examples, and further includes wherein a first notched section of the plurality of notched sections is arranged at an angle relative to a second notched section of the plurality of notched sections, the first notched section intersecting the second notched section, with the first notched section and second notched section each being angled relative to a width of the main section. An eighth example of the cover optionally includes one or more or each of the first through seventh examples, and further includes wherein each notched section includes a notch formed by a first angled surface and a second angled surface, with the first angled surface and second angled surface being angled relative to an outer surface the main section. A ninth example of the cover optionally includes one or more or each of the first through eighth examples, and further includes wherein the first angled surface and second angled surface are angled relative to the outer surface of the main section in opposing directions by a same amount of angle.

In one embodiment, a system comprises: an engine; and a vehicle component cover coupled to the engine, the cover including: a solid elastic encasement; and a rigid support structure embedded within the encasement, the support structure including a plurality of breakaway sections. In a first example of the system, the system further comprises a plurality of notched sections joining each breakaway section of the plurality of breakaway sections to each adjacent breakaway section of the plurality of breakaway sections. A second example of the system optionally includes the first example, and further includes wherein the support structure includes a front end and a back end, the front end of the support structure being positioned toward a front end of the engine, and wherein a greater amount of notched sections of the plurality of notched sections are positioned at the front end of the support structure than the back end. A third example of the system optionally includes one or both of the first and second examples, and further includes wherein the encasement includes a main opening extending from a top end of the cover to a bottom end of the cover, the opening shaped to surround a component of the engine. A fourth example of the system optionally includes one or more or each of the first through third examples, and further includes wherein the support structure includes an annular section formed by the plurality of breakaway sections, and wherein the annular section encompasses a perimeter of the main opening. A fifth example of the system optionally includes one or more or each of the first through fourth examples, and further includes wherein the annular section includes a plurality of notched sections, and wherein a length of each notched section extends in a radial direction relative to a central axis of the main opening.

In another embodiment, a vehicle component cover comprises: a solid encasement including a plurality of passages; and a support structure embedded within the encasement, the support structure including: a main section including a plurality of breakaway sections and a plurality of notched sections, where, for each breakaway section of the plurality of breakaway sections, a corresponding notched section of the plurality of notched sections joins the breakaway section to an adjacent, corresponding breakaway section of the plurality of breakaway sections; and a plurality of lock orifices, with each lock orifice of the plurality of lock orifices positioned to encircle a corresponding passage of the plurality of passages. In a first example of the cover, each lock orifice of the plurality of lock orifices is positioned at a main section of the plurality of main sections. A second example of the cover optionally includes the first example, and further includes wherein the encasement includes a top end and a bottom end, the plurality of passages forming a first plurality of openings in a recess at the top end, and wherein each passage of the plurality of passages tapers from a larger, first diameter at the recess to a smaller, second diameter in a direction from the top end to the bottom end. A third example of the cover optionally includes one or both of the first and second examples, and further includes wherein each notched section of the plurality of notched sections is angled relative to a width of the main section.

In another representation, a vehicle comprises: an engine compartment having an engine disposed therein; a vehicle component cover coupled to the engine, the cover including: a solid encasement; and a support structure embedded within the encasement, the support structure including a main section and a plurality of notched sections positioned along the main section, with each notched section of the plurality of notched sections extending partway into a thickness of the main section; a transmission; and an electric machine selectably coupleable to the transmission via one or more clutches, the electric machine adapted to drive the transmission.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A cover for an engine, comprising: a solid encasement; and a support structure embedded within the encasement, the support structure including a main section, a plurality of notched sections positioned along the main section, with each notched section of the plurality of notched sections extending partway into a thickness of the main section, and a plurality of arms coupled to the main section, wherein each arm in the plurality of arms includes a tab positioned away from the main section with a slot for receiving a fastener coupling the cover to the engine, wherein the support structure includes an annular section shaped to encircle a main opening of the solid encasement, and wherein the annular section includes one of the notched sections to form a breakaway section.

2. The cover of claim 1, wherein the support structure is comprised of a stiffer material than the solid encasement.

3. The cover of claim 1, wherein each notched section of the plurality of notched sections is positioned at a different, corresponding location of a plurality of locations along the main section, and wherein a length of each notched section is the same as a width of the main section at the corresponding location.

4. The cover of claim 3, wherein the length of each notched section is arranged in a same direction as the width of the main section at the corresponding location.

5. The cover of claim 3, wherein the length of each notched section is arranged at an angle relative to the width of the main section at the corresponding location.

6. The cover of claim 1, wherein the support structure includes an annular section shaped to encircle a main opening of the solid encasement.

7. The cover of claim 6, wherein the annular section includes one of the notched sections of the plurality of notched sections.

8. The cover of claim 1, wherein a first notched section of the plurality of notched sections is arranged at an angle relative to a second notched section of the plurality of notched sections, the first notched section intersecting the second notched section, with the first notched section and second notched section each being angled relative to a width of the main section.

9. The cover of claim 1, wherein each notched section includes a notch formed by a first angled surface and a second angled surface, with the first angled surface and the second angled surface being angled relative to an outer surface the main section.

10. The cover of claim 9, wherein the first angled surface and the second angled surface are angled relative to the outer surface of the main section in opposing directions by a same amount of angle.

11. A system, comprising:
an engine; and
a vehicle component cover coupled to the engine, the cover including:
a solid elastic encasement; and
a rigid support structure embedded within the encasement, the support structure including a plurality of breakaway sections,
wherein the support structure includes an annular section formed by the plurality of breakaway sections, the annular section encompassing a perimeter of a main opening and the annular section including a plurality of notched sections, wherein a length of each notched section extends in a radial direction relative to a central axis of the main opening.

12. The system of claim 11, further comprising a plurality of notched sections joining each breakaway section of the plurality of breakaway sections to each adjacent breakaway section of the plurality of breakaway sections.

13. The system of claim 12, wherein the support structure includes a front end and a back end, the front end of the support structure being positioned toward a front end of the engine, and wherein a greater amount of notched sections of the plurality of notched sections are positioned at the front end of the support structure than the back end.

14. The system of claim 11, wherein the main opening extends from a top end of the cover to a bottom end of the cover, the main opening shaped to surround a component of the engine.

15. A vehicle component cover, comprising:
a solid encasement including a plurality of passages; and
a support structure embedded within the encasement, the support structure including:
a main section including a plurality of breakaway sections and a plurality of notched sections, where, for each breakaway section of the plurality of breakaway sections, a corresponding notched section of the plurality of notched sections joins the breakaway section to an adjacent, corresponding breakaway section of the plurality of breakaway sections; and
a plurality of lock orifices, with each lock orifice of the plurality of lock orifices positioned to encircle a corresponding passage of the plurality of passages,
wherein each notched section of the plurality of notched sections is angled relative to a width of the main section.

16. The cover of claim 15, wherein each lock orifice of the plurality of lock orifices is positioned at a main section of the plurality of breakaway sections.

17. The cover of claim 15, wherein the encasement includes a top end and a bottom end, the plurality of passages forming a first plurality of openings in a recess at the top end, and wherein each passage of the plurality of passages tapers from a larger, first diameter at the recess to a smaller, second diameter in a direction from the top end to the bottom end.

* * * * *